United States Patent
Betts, Jr. et al.

(10) Patent No.: US 7,295,098 B2
(45) Date of Patent: Nov. 13, 2007

(54) SYSTEMS AND METHODS FOR PROVIDING THEFT PROTECTION IN A MACHINE

(75) Inventors: Edward H. Betts, Jr., Chillicothe, IL (US); Timothy Alan Booth, Groveland, IL (US); Roy C. Fonseca, East Peoriam, IL (US); Mark J. Hilbert, Peoria, IL (US); Daniel Douglas Swords, Washington, IL (US); Nathan Ralph Taylor, Washington, IL (US); David L. Zwetz, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 416 days.

(21) Appl. No.: 10/742,810

(22) Filed: Dec. 23, 2003

(65) Prior Publication Data

US 2005/0134115 A1    Jun. 23, 2005

(51) Int. Cl.
G05B 23/00 (2006.01)
G06F 7/04 (2006.01)
G08B 29/00 (2006.01)
B60L 3/00 (2006.01)
G08B 21/00 (2006.01)

(52) U.S. Cl. .................. 340/5.2; 340/5.8; 340/679; 307/9.1

(58) Field of Classification Search .................. 70/262; 307/10.4; 340/5.1, 5.2, 5.8, 678, 679; 361/269; 701/32, 34
See application file for complete search history.

(56) References Cited

U.S. PATENT DOCUMENTS

| | | | |
|---|---|---|---|
| 5,229,648 A | 7/1993 | Sues et al. ................. 307/10.2 |
| 5,481,253 A | 1/1996 | Phelan et al. ........... 340/825.31 |
| 5,513,244 A | 4/1996 | Joao et al. ..................... 379/58 |
| 5,559,493 A | 9/1996 | Karnwie-Tuah ............. 340/426 |
| 5,675,490 A | 10/1997 | Bachhuber ............. 364/424.04 |
| 5,687,081 A * | 11/1997 | Wellman et al. .............. 701/50 |
| 5,828,297 A | 10/1998 | Banks et al. ................ 340/426 |
| 5,835,868 A | 11/1998 | McElroy et al. ................ 701/2 |
| 5,917,405 A | 6/1999 | Joao ........................... 340/426 |
| 6,060,981 A | 5/2000 | Landes ........................ 340/426 |
| 6,144,112 A | 11/2000 | Gilmore ..................... 307/10.2 |
| 6,346,876 B1 | 2/2002 | Flick ........................... 340/426 |
| 6,356,186 B1 | 3/2002 | Price et al. ................. 340/426 |
| 6,473,813 B1 * | 10/2002 | Sheafor ........................ 710/31 |
| 6,853,910 B1 * | 2/2005 | Oesterling et al. .......... 701/207 |
| 6,944,121 B1 * | 9/2005 | Weste et al. ................. 370/208 |

(Continued)

Primary Examiner—Michael Sherry
Assistant Examiner—Hal I. Kaplan
(74) Attorney, Agent, or Firm—Finnegan, Henderson, Farabow, Garrett & Dunner

(57) ABSTRACT

Methods and systems may provide theft protection in one or more work machines. Methods and systems may control one or more operational systems and may provide and manage varying levels of access to work machines. Methods and systems may react to override attempts in order to provide robust theft protection. One or more control modules embedded in a work machine may be leveraged to perform theft protection services. Methods and systems may activate a first control module to restrict access to a first operational system in a work machine and activate a second control module to restrict access to a second operational system in the work machine. The first control module may detect a substitution of a new control module for the second control module and automatically configure the new control module to restrict access to the second operational system in the work machine.

35 Claims, 10 Drawing Sheets

U.S. PATENT DOCUMENTS

| | | | |
|---|---|---|---|
| 6,965,326 B2 * | 11/2005 | Allison | 340/999 |
| 6,976,217 B1 * | 12/2005 | Vertaschitsch et al. | 715/717 |
| 7,092,799 B2 * | 8/2006 | Oesterling et al. | 701/1 |
| 2002/0116093 A1 * | 8/2002 | Aldrich et al. | 701/1 |
| 2003/0188303 A1 * | 10/2003 | Barman et al. | 717/170 |
| 2004/0010349 A1 * | 1/2004 | Perez et al. | 700/287 |

* cited by examiner

SYSTEMS AND METHODS FOR PROVIDING THEFT PROTECTION IN A MACHINE

TECHNICAL FIELD

This invention relates generally to control systems and more particularly, to systems, methods, and articles of manufacture for providing theft protection and deterrence in work machines.

BACKGROUND

Certain vehicles, especially industrial work machines, are expensive and not easily replaced. Thus, it is vital to provide such vehicles with robust theft protection systems. Nonetheless, it may not be desirable to simply disable a vehicle entirely in order to provide such protection. For example, an operator may wish to protect a vehicle (e.g., a vessel) from theft while its engine remains running. In addition, the operator may wish to restrict access to certain systems on the vehicle without deactivating such systems. For example, a vessel operator/owner may wish to allow maintenance personnel to access and/or operate the vessel subject to certain restrictions (e.g., engine speed limit).

In certain situations, a plurality of vehicles may need protection. For example, a fleet of geographically-dispersed vessels may require protection from theft. Thus, the ability to provide theft protection to each of these vehicles from a central location is critical, in terms of both economic efficiency and logistics.

To address the above concerns, various vehicle theft-protection systems have emerged, which attempt to provide robust and flexible theft protection capabilities. In many of these systems, a primary controller, to which an operator has access, communicates with a secondary controller that controls an engine or vehicle system (e.g., fuel pump). In the event the primary controller detects an unauthorized operator, the secondary unit will deactivate its respective system. Conventional theft-protection systems, however, are deficient on several fronts. Typical systems fail to provide theft protection while facilitating various system-specific modes of protection. For example, typical systems do not restrict the operation of certain vehicle systems while allowing unrestricted operation of other systems. Further, typical systems do not provide centralized control over a plurality of vehicles. In addition, conventional systems fail to provide robust protection in that they are easily defeated by bypassing or removing the primary and/or secondary controllers from these systems. Moreover, if an existing controller is replaced with a new controller, the new controller may not be configured to provide subsequent theft protection.

U.S. Pat. No. 6,356,186 to Price et al. describes a vehicle anti-theft system which allows the vehicle engine to operate in various protection modes. One such protection mode includes speed limit mode, in which a controller limits road or engine speed. The '186 patent mentions that limiting engine speed may allow maintenance personnel to move a vehicle subject to a 1000 rpm engine speed limit. Although the system described by Price et al. provides a solution for allowing a vehicle engine to operate in various theft protection modes, it is limited to engine operation. That is, the disclosed system does not allow vehicle operators to set different protection modes for a plurality of different types of systems and components associated with a vehicle. In addition, the system described by Price et al. does not provide robust theft protection and does not address the problems encountered when the controller is removed or bypassed by a thief.

U.S. Pat. No. 6,144,112 to Gilmore describes a vehicle anti-theft system which immobilizes a vehicle's fuel pump to provide theft protection. The anti-theft system uses a pump control unit (PCU) to control the fuel pump. In the system described by Gilmore, the PCU cannot be activated to control the fuel pump unless it receives certain responses from an engine control unit (ECU). Thus, if the ECU is bypassed by a thief, the fuel pump will not activate and the engine will not start. Although Gilmore provides a solution for providing theft protection in the event an ECU is bypassed, it is limited solely to deactivating a fuel pump to prevent an engine start. Thus, the disclosed system does not provide theft protection while allowing certain systems and components to operate. Further, the system described by Gilmore does not address the problems associated with configuring a new ECU upon removal of an existing unit. In addition, Gilmore's system does not address the problems associated with centrally protecting a fleet vehicles.

Methods, systems, and articles of manufacture consistent with certain embodiments of the present invention are directed to solving one or more of the problems set forth above.

SUMMARY OF THE INVENTION

Methods and systems may provide theft protection in one or more work machines. In certain embodiments, methods and systems may control one or more operational systems and may provide and manage varying levels of access to work machines. Methods and systems may react to override attempts in order to provide robust theft protection.

Consistent with embodiments of the present invention, methods and systems may leverage one or more embedded control modules to provide theft protection services. Methods and systems may be provided for activating a first control module to restrict access to a first operational system in a work machine. Methods and systems may activate a second control module to restrict access to a second operational system in the work machine. In one configuration, the first control module may detect a substitution of a new control module for the second control module and automatically configure the new control module to restrict access to the second operational system in the work machine.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, which are described in sufficient detail to enable those skilled in the art to practice the invention. The description of the exemplary embodiments does not indicate or imply that other embodiments or implementations do not fall within the scope of present invention. It is to be understood that other implementations may be utilized and that structural and method changes may be made without departing from the scope of present invention.

TDS Configuration Overview

Figure 1:
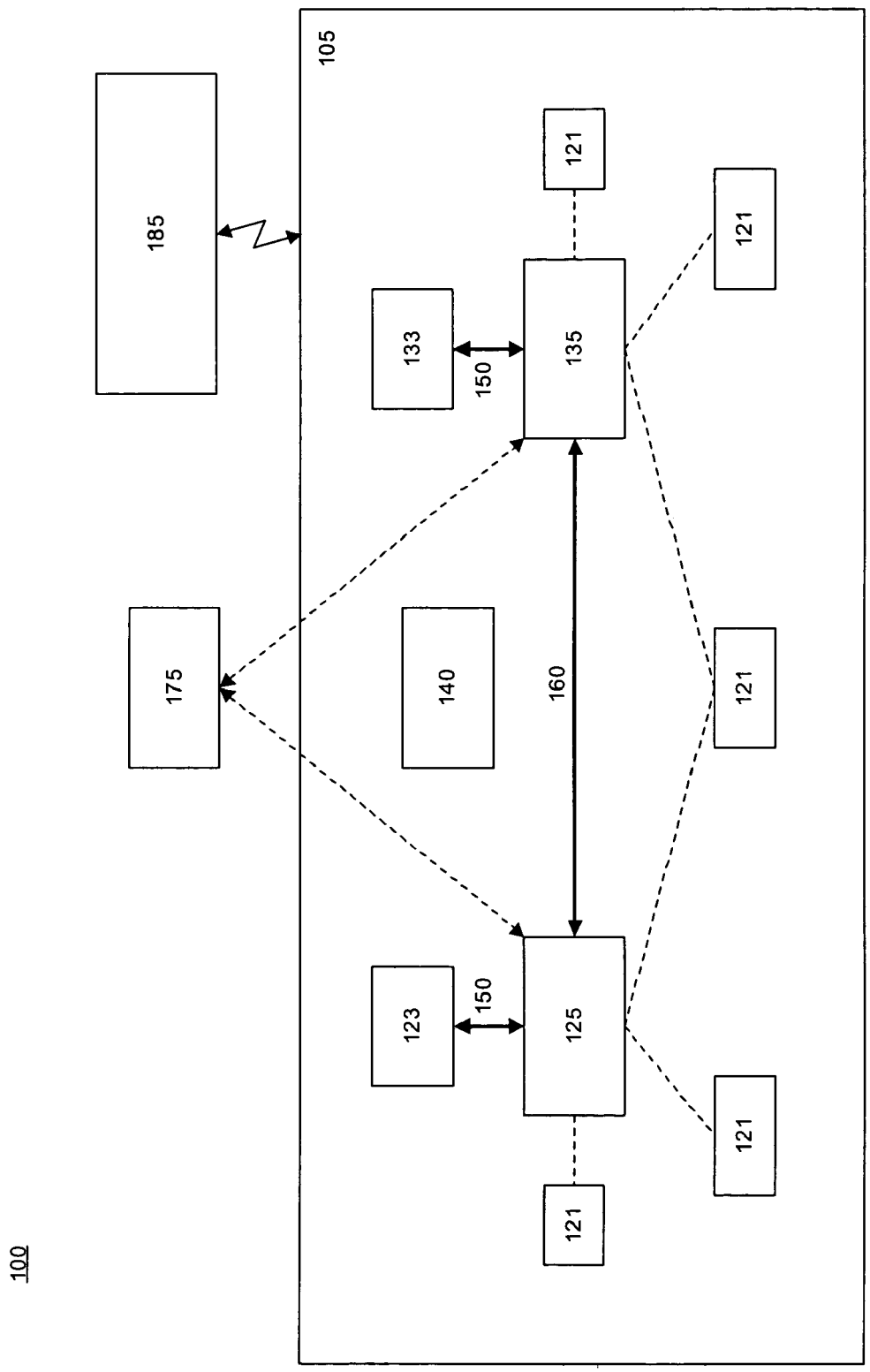
FIG. 1 is a block diagram of an exemplary environment in which features and aspects consistent with embodiments of the present invention may be implemented.

FIG. 1 illustrates an exemplary environment 100 in which features and principles consistent with embodiments of the present invention may be implemented. The number of components in environment 100 is not limited to what is shown and other variations in the number and arrangements of components are possible, consistent with embodiments of the invention. As shown in FIG. 1, environment 100 may comprise one or more work machines 105, one or more service systems 175, and one or more computer systems 185.

As used herein, the term "work machine" refers to a fixed or mobile machine that performs at least one operation associated with a particular industry, such as mining, construction, farming, etc. and operates between or within work environments (e.g., construction site, mine site, power plant, etc.). The term "work machine" also encompasses fixed and/or mobile machines for use in non-industrial settings (e.g., machines for personal use). Work machine 105 may represent commercial machines, such as trucks, cranes, earth moving vehicles, mining vehicles, backhoes, material handling equipment, farming equipment, marine vessels, aircraft, and any type of machine that operates in a work environment. In addition, work machine 105 may represent an industrial fixed machine, such as an engine-based system operating on an off-shore drilling platform. Work machine 105 may also represent passenger automobiles, fishing boats, yachts, etc. As illustrated in FIG. 1, work machine 105 may include one or more operational systems 121, communication modules 123 and 133, master Theft Protection Control Modules (TPCMS) 125, secondary TPCMs 135, and monitoring systems 140. One or more master TPCMs 125 and secondary TPCMs 135 may collaboratively implement or make up one or more Theft Deterrent Systems (TDSs) for work machine 105.

Operational system 121 may represent any type of system, network, and/or module associated with work machine 105 that controls some aspect of operation associated with work machine 105. Accordingly, operational system 121 may represent an ignition system, a fuel injection system, an oil transport system, a transmission, a throttle system, a power system, a braking system, a cooling system, a navigation system, and/or an engine or other propulsion system. Further, consistent with embodiments of the present invention, operation system 121 may include one or more hydraulic, mechanical, electronic, and software-based components.

Communication module 123 may represent one or more systems and/or devices for receiving, routing, and/or displaying information. Consistent with embodiments of the present invention, communication module 123 may include one or more hardware, software, and/or firmware components that enable module 123 to perform its respective functions. In certain embodiments, communication module 123 may include a display device, which may be any type of output device configured to output data (e.g., text, images, code, or any other type of information). For example, communication module 123 may include a cathode ray tube, liquid crystal, light-emitting diode, gas plasma, or other type of display mechanism. Communication module 123 may include one or more operator display devices coupled to one or more operational systems 121. Communication module 123 may also include an input device, which may be any type of input mechanism used to receive data, such as a keyboard, a mouse, and/or a touch screen. The input device may additionally or alternatively include a data reading device and/or an input port. In certain configurations, communications module 123 may include one or more processors operatively configured to execute program instructions.

Communications module 133, which is coupled to secondary TPCM 135, may be similar in configuration and operation to communications module 123 described above. In operation, communications modules 123 and 133 may transmit and receive information to/from TPCMs 125 and 135, respectively, and may include specific interfaces (e.g., GUIs) for receiving and displaying such information.

As illustrated in FIG. 1, communications modules 123 and 133 may each be coupled to one or more data links 150. Data link 150 may represent one or more proprietary and/or non-proprietary data links, which may leverage one or more wireline and/or wireless techniques. In one embodiment of the present invention, data link 150 may represent Society of Automotive Engineers (SAE) J1939, Controller Area Network (CAN), etc. standard data links. Data link 160, which may be interposed between master TPCM 125 and secondary control module 135 may also represent a proprietary or a non-proprietary data link. In certain embodiments, data link 150 may represent a J1939 data link while data link 160 represents a proprietary data link, or vice versa.

Consistent with embodiments of the present invention, one or more operational systems 121 may be coupled to master TPCM 125 and/or secondary TPCM 135 via one or more data links similar to data links 150 and/or 160. For example, a transmission system may be coupled to master TPCM 125 and secondary TPCM 135 via one or more J1939 data links.

Master TPCM 125 represents one or more systems, devices, and/or mechanisms configured to perform certain functions consistent with embodiments of the present invention. Master TPCM 125 may be implemented by one or more hardware, software, and or firmware components. In certain embodiments, master TPCM 125 may be embodied in a control unit operating in work machine 105 that controls one or more operational systems. For example, master TPCM 125 may be embodied in an Engine Control Module (ECM) embedded in work machine 105.

Consistent with embodiments of the present invention, master TPCM 125 may include hardware, software, and/or firmware for performing various theft protection processes consistent with embodiments of the present invention. In certain embodiments, master TPCM 125 may implement TDS functionality by interfacing and controlling various operational systems 121. In one configuration, master TPCM 125 may prevent and/or limit control of operational systems 121. For example, master TPCM 125 may provide: fuel injection lock-out, starter lock-out, a keyless ignition lock-out, and engine speed limiting. Master TPCM 125 may leverage information received (or obtained) from various sensors, switches, and/or gauges to control various operational systems 121 included in work machine 105. For example, master TPCM 125 may leverage one or more motion sensors, magnetic switches, pressure switches, alarms, speed sensors, distance sensors, throttle position sensors, pressure sensors, voltage sensors, temperature sensors, ignition reference sensors, speed control switches, fuel injector sensors, etc. In certain configurations, master TPCM 125 may leverage such devices to monitor one or more operational systems 121, locations in work machine 105, and/or activity in work machine 105.

In certain embodiments, master TPCM 125 may be configured to provide and manage varying levels of access to work machine 105 and the TDS. For example, master TPCM 125 may grant "primary" access to an owner or operator of work machine 105 and "secondary" access to a non-owner, such as a technician or dock master. Primary access may provide full control over work machine 105 and its operation systems. Primary access may also provide full control over TDS features provided to work machine 105. Secondary access may provide limited access to work machine 105. For example, secondary access may prevent an operator from increasing engine speed above a certain RPM threshold. Secondary access may also restrict or prevent control over TDS features. In certain embodiments, master TPCM 125, in conjunction with secondary TPCMs 135, may manage access to work machine 105 based on one or more security codes or passwords.

Figure 2:
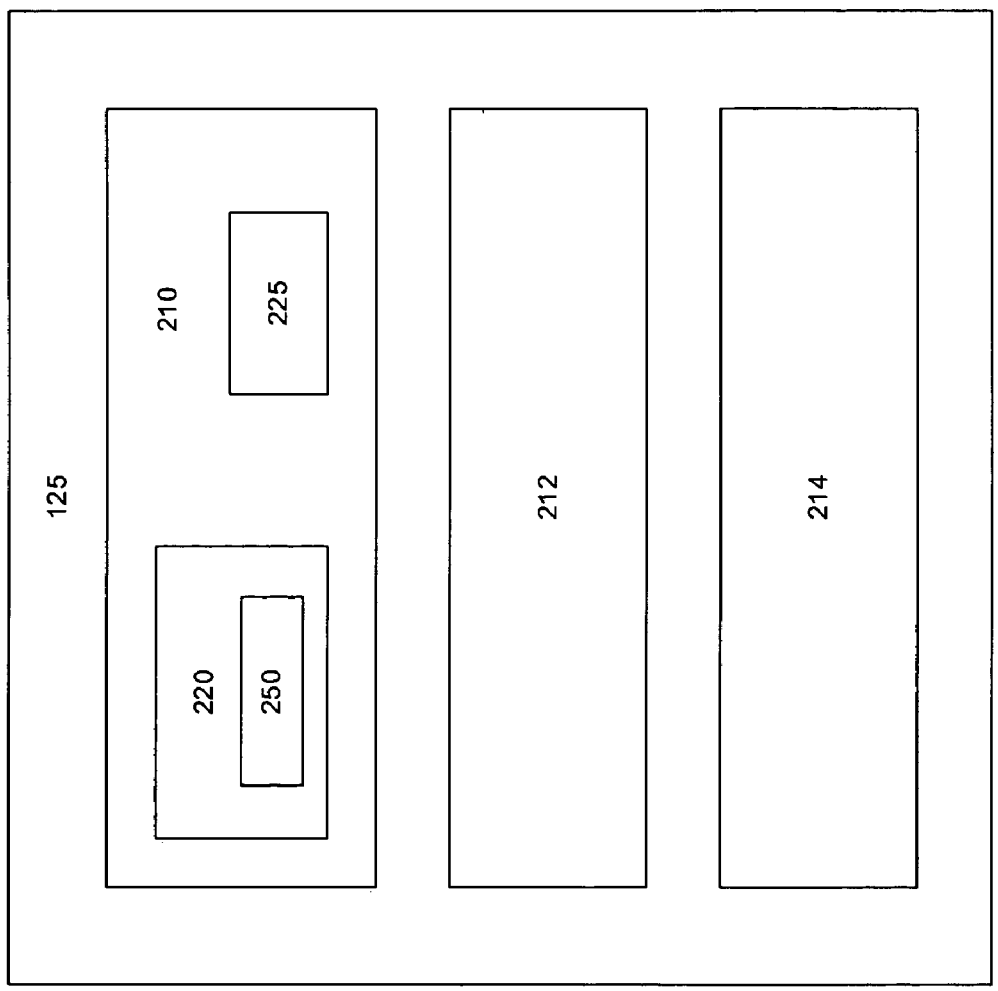
FIG. 2 is a block diagram of an exemplary control module consistent with embodiments of the present invention.
Figure 3:
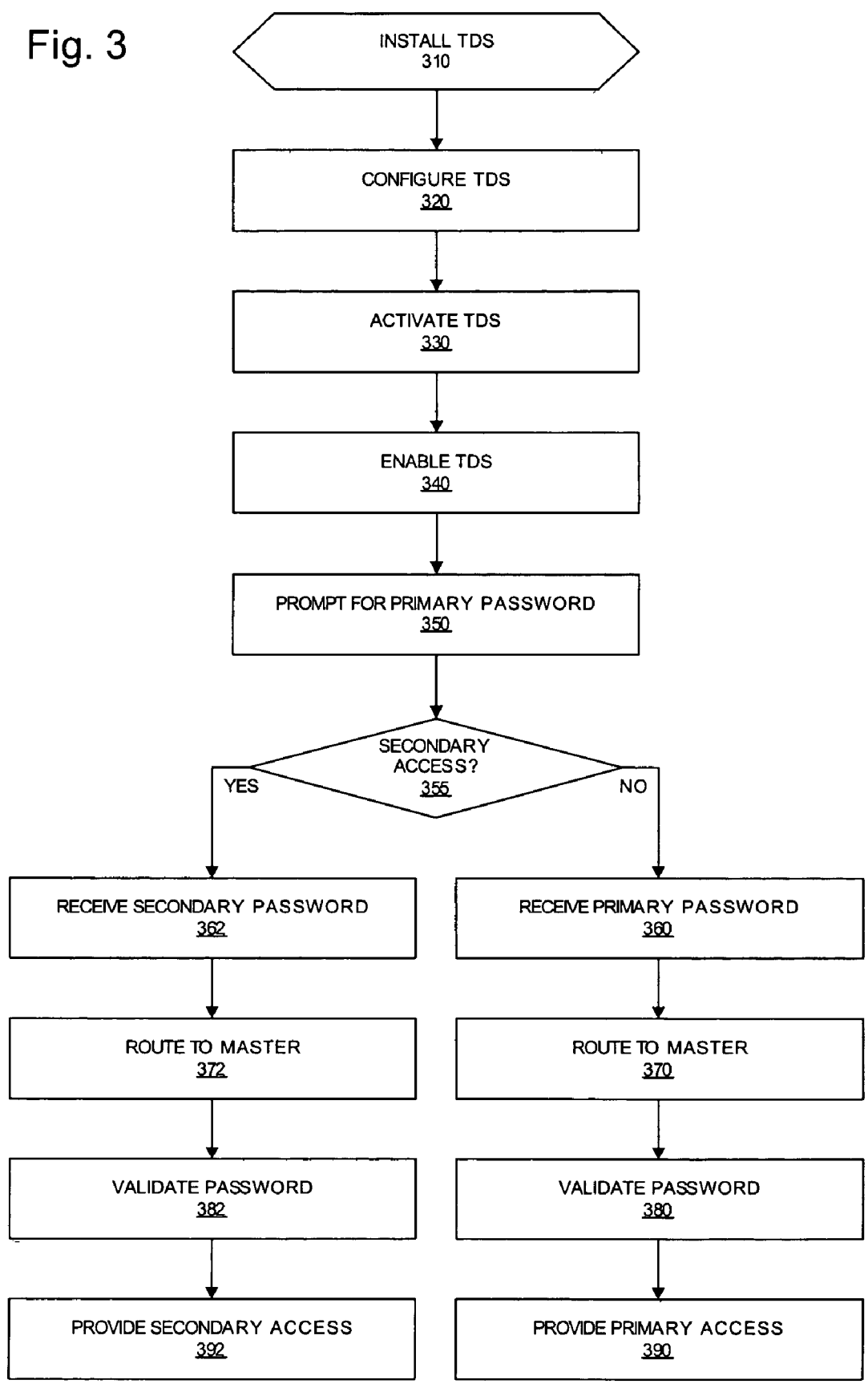
FIG. 3 is a flowchart depicting exemplary Theft Deterrent System (TDS) configuration processes consistent with certain embodiments of the present invention.

Master TPCM 125 may include various components for implementing the TDS for work machine 105. One exemplary configuration of master TPCM 125 is illustrated in FIG. 2. As shown, master TPCM 125 may include a processing core 210, a systems interface 212, and a data link interface 214.

Processing core 210 may include logic and processing components used by master TPCM 125 to perform certain communications, control, and theft protection functionalities. In one embodiment, processing core 210 may include one or more memories 220 and processors 225.

Memory 220 may include any system and/or mechanism capable of storing information. Memory 220 may be embodied with a variety of components and/or subsystems, including a RAM (random access memory), a ROM (read-only memory), magnetic and optical storage elements, organic storage elements, audio disks, and video disks. In certain embodiments, memory 220 may include one or more programmable, erasable and/or re-useable storage components, such as EPROM (erasable programmable read-only memory) and EEPROM (electrically erasable programmable read-only memory). Memory 220 may also include constantly-powered nonvolatile memory operable to be erased and programmed in blocks, such as flash memory (i.e., flash RAM). Memory 220 may provide a primary memory for processor 225, such as for program code. Memory 220 may, for example, include program code for communications; kernel and device drivers; configuration information, and other applications that might be embedded within master TPCM 125. Although a single memory is shown, any number of memory devices may be included in master TPCM 125, and each may be configured for performing distinct functions.

Processor 225 may be operatively configured to execute instructions to perform certain functions consistent with embodiments of the present invention. Processor 225 may be configured for routing information among components and devices and for executing instructions from memory 220. Although FIG. 2 illustrates a single processor, master TPCM 125 may include a plurality of general purpose processors and/or special purpose processors (e.g., ASICS). Processor 225 may also include, for example, one or more of the following: a co-processor, memory, registers, and other processing devices and systems as appropriate.

In certain embodiments, functionality of processing core 210 may be embodied within an integrated microprocessor or microcontroller. Such a microcontroller may, for example, include an integrated CPU, memory, and one or more peripherals. Depending on the implementation, master TPCM 125 may include one or more microcontrollers in addition to or in place of memory 220 and/or processor 225. Known microcontrollers include Microchip's PIC, the 8051, Intel's 80196, and Motorola's 68HCxx series.

Systems interface 212 may represent one or more devices, mechanisms, and or components for interfacing master TPCM 125 with various operational systems associated with work machine 105. Systems interface 212 may be implemented by one or more hardware, software, and or firmware elements. In certain embodiments, systems interface 212 may include one or more input and output ports configured to send and receive information to and from operational systems 121.

Data link interface 214 may represent one or more interface devices that interconnect one or more data links (e.g., 150, 160) with master TPCM 125. Data link interface 214 may connect to proprietary and non-proprietary data links. In one embodiment, data link interface 214 may include virtual (i.e., software) ports that allow a single connection to act as if there were multiple connections.

In operation, processing core 210 may access a software layer 250 embedded in master TPCM 125 (e.g., in memory 220) to facilitate interactions between master TPCM 125 and the various components to which it is coupled. Software layer 250 may include a hardware interface component. Such a hardware interface component may include boot executable software and/or driver software that drives one or more data link ports and services one or more data links coupled to master TPCM 125. In one embodiment, the hardware interface component may receive I/O requests and convert those requests to protocols required by specific systems. The hardware interface component may also enumerate devices coupled to one or more data links, administer such devices, and perform certain operations for the devices.

Software layer 250 may also include a protocol control component, which may be used to perform communication services, such as formatting data messages for specific protocols and performing protocol conversions and translations.

In certain embodiments of the present invention, TDS features consistent with the present invention may be implemented by executable program code embedded in master TPCM 125. In such embodiments, software layer 250 embedded in master TPCM 125 may include one or more applications that perform various theft protection operations consistent with embodiments of the present invention. Such applications may perform various functions such as fuel injection lock-out, starter lock-out, a keyless ignition lock-out, and engine speed limiting. The applications may also perform system access functions.

Consistent with certain embodiments, one or more operational parameters may be stored in memory 220, which may be included in or leveraged by components of software layer 250. Such parameters may be associated with various operational systems 121. For example, parameters may be associated with a fuel injection system, a transmission, a starter, an ignition, and an RPM limiter. The parameters may be used to install, activate or configure, and enable TDS functionality in master TPCM 125. For example, setting certain parameters may install, activate, configure a TDS. Further, setting certain parameters may enable/disable certain features (e.g., transmission lock, RPM limit, etc.). The parameters may also be used to provide status information to various components in work machine 105. In certain embodiments, one or more parameter identifiers (PIDs) may be associated with each parameter. For example, a first PID may be associated with an installation parameter that installs/uninstalls TDS functionality, and a second PID may be associated with a TDS status parameter. In addition, a third PID may be associated with a parameter that indicates master or slave operation, and a fourth PID may be associated with a parameter that locks/unlocks the TDS.

The master TPCM shown in FIG. 2 is exemplary and not intended to be limiting. The number of components depicted in FIG. 2 is not limited to what is shown and other variations in the number of arrangements of components are possible, consistent with embodiments of the invention. For example, certain functionality associated with software layer 250 may be implemented by a combination of software, hardware and firmware components. Further, certain illustrated components of master TPCM 125 may not be present, and additional components not shown may be added, depending on the implementation. For example, master TPCM 125 may include a power conditioning unit, an internal power supply, a temperature control unit, a real time clock, etc.

As mentioned above, master TPCM 125 and secondary TPCMs 135 collaboratively implement a TDS for vehicle 105. Secondary TPCM 135 may be similar in configuration and operation as master TPCM 125 described above in connection with FIGS. 1 and 2. For example, secondary TPCM 135 may be an ECM operating in work machine 105. Consistent with embodiments of the present invention, secondary TPCM 135 may be configured to operate as a slave to master TPCM 125. In one example, master TPCM 125 may reside in one location in work machine 105 (e.g., an engine room/component) while secondary TPCM 135 resides in another location on the work machine (a control room/component). The various functions associated with master and slave configurations are detailed below in connection with FIGS. 3-7.

In certain embodiments, more than one TPCM may be coupled to, and configured to control, a given operational system 121. For example, both master TPCM 125 and secondary TPCM 135 may be coupled to a single operational system (e.g., a transmission system). In such embodiments, the TPCMs may each be configured to control certain aspects/functions of the operational system 121. In addition, or as an alternative, the TPCMs may collaboratively control aspects/functions of the operation system 121. In operation, the TPCMs may communicate with each other to control the operational system 121. For example, if master TPCM 125 and secondary TPCM 135 control a given operational system 121 and master TPCM 125 receives a command to restrict access to that system, then master TPCM 125 may send one or more messages to secondary TPCM 135. Secondary TPCM 135 may then restrict access to the system, either alone or in conjunction with master TPCM 125.

Consistent with embodiments of the present invention, work machine 105 may include any number of control modules similar in structure and function as module 125. For example, work machine 105 may include a plurality of dispersed ECMs. In such embodiments, each control module or ECM may be configured as a master TPCM and a slave TPCM. In one example, a single ECM could be designated as a master TPCM and a plurality of other ECMs may be designated as slaves, thereby implementing an TDS in a work machine. In addition, or as an alternative, a plurality of TDSs may be implemented within a single work machine. That is, each of a plurality of ECMs in work machine 105 could be configured as a master TPCM, and each such master TPCM may interact with one or more secondary TPCMs (i.e., slaves). In this fashion, a plurality of independent and/or collaborative TDSs may be implemented in work machine 105. In certain embodiments, an operator may specify (e.g., via service system 175) a particular master/slave configuration. Further, master/slave configurations may be dynamically changed, e.g., via service system 175.

Monitoring system 140 in work machine 105 may represent one or more devices, sensors, and switches for monitoring operational systems 121 and/or activity in work machine 105. Monitoring system 140 may include one or more motion sensors, magnetic switches, pressure switches, alarms, speed sensors, distance sensors, throttle position sensors, pressure sensors, voltage sensors, temperature sensors, ignition reference sensors, speed control switches, fuel injector sensors, etc. Monitoring system 140 may also include one or more notification devices, such as alarms, sirens, lighting devices, etc. In operation, master TPCM 125 may leverage monitoring system 140 to provide TDS functions. Further, service system 175 and or computer system 185 may leverage monitoring system 140 to obtain information associated with work machine 105.

The number of components in work machine 105 is not limited to what is shown and other variations in the number and arrangements of components are possible, consistent with embodiments of the invention. In addition, certain illustrated components may not be present and certain components not shown may be added, consistent with embodiments of the present invention. For example, in certain configurations, secondary control module 135 may not be present. Further, as explained above service system 175 may be located internal to work machine 105.

Referring back to environment 100 of FIG. 1, service system 175 may represent one or more portable, or fixed, service systems that perform diagnostics, configuration, and/or service operations for work machine 105. Such operations may include receiving and sending messages to systems associated with work machine 105 (e.g., TPCMs 125 and 135). Service system 175 may be associated with a user (e.g., owner, operator, etc.), multiple users, a business entity (dealer, manufacturer, vendor, etc.), a department of a business entity (e.g., service center, operations support center, logistics center, etc.), and any other entity that sends and/or receives information to/from work machine 105. Service system 175 may be an electronic device that connects to various systems and components of work machine 105 through a network or data link (e.g., data link 160, an RS-232 serial link, etc.). In certain embodiments, service system 175 may include a PC-based service tool. In certain embodiments, service system 175 may represent, leverage, or be coupled to one or more computing systems, such as a workstation, personal digital assistant, laptop, mainframe, etc.

In one embodiment, as shown in FIG. 1, service system 175 may be located external to work machine 105 and may communicate with work machine 105 via one or more data links, data networks, and/or voice networks. In addition, or as an alternative, service system 175 may be located in work machine 105, either permanently or temporarily. For example, service system 175 may be portable, and a technician or operator may temporarily connect it to various systems in work machine 105 via a data link similar to data link 160.

Using service system 175, a user or an application executed by a processor may perform diagnostics, configuration, and/or service operations on various systems on work machine 105. In operation, service system 175 may (automatically or at the direction of a technician) initialize and configure master TPCM 125 and secondary control module 135 to perform theft protection functions consistent with the present invention.

Computer system 185 may represent one or more computing systems, each executing one or more software applications. For example, computer system 185 may be a workstation, personal digital assistant, laptop, mainframe, etc. Computer system 185 may include Web browser software that requests and receives data from a server when executed by a processor and displays content to a user operating the system. In one embodiment of the present invention, computer system 185 may be connected to one or more systems and modules in work machine 105 through one or more wireline based data links. Computer system 185 may also be connected to systems and modules in work machine 105 through one or more wireless based data links, such as cellular, satellite, and radio-based communication data links.

In certain embodiments, computer system 185 may interact with one or more systems and modules in work machine 105 via a network. Such a network may include the Internet, a virtual private network, a local area network, a wide area network, a broadband digital network or any other structure for enabling communication between two or more nodes or locations. The network may include a shared, public, or private data network and encompass a wide area or local area, and the network may include one or more wired and/or wireless connections. An exemplary network may employ communication protocols such as Transmission Control and Internet Protocol (TCP/IP), Asynchronous Transfer Mode (ATM), Ethernet, or any other compilation of procedures for controlling communications among network locations.

Similar to service system 175, computer system 185 may be associated with a user (e.g., customer), multiple users, a business entity (dealer, manufacturer, vendor, etc.), a department of a business entity (e.g., service center, operations support center, logistics center, etc.), and any other type of entity that sends and/or receives information to/from various elements in work machine 105.

As explained above, the number of components in environment 100 is not limited to what is shown and other variations in the number and arrangements of components are possible, consistent with embodiments of the invention. In addition, certain illustrated components may not be present and certain components not shown may be added, consistent with embodiments of the present invention.

TDS Overview

As mentioned above, master TPCM 125 and secondary TPCM 135 may collaboratively implement a TDS for work machine 105. In certain embodiments, implementation and operation of the TDS may be consistent with the steps illustrated in the flowchart of FIG. 3. The process of FIG. 3 may begin when a TDS is installed in work machine 105 (step 310). In certain embodiments, installing a TDS in work machine 105 may include installing a plurality of ECMs that include hardware and software similar to master TPCM 125 and/or programming or updating one or more existing ECMs with software similar to software 250. Installing a TDS may further include configuring one or more ECMs to operate as TPCMs, by for example, setting one or more parameters/flags in each ECM's memory. For example, a TDS installation flag in the ECM memory may be activated to indicate that the TDS is installed, and/or an activation flag may be set to indicate that the ECM is operational as a TPCM. In one embodiment, a TDS may be installed in work machine 105 by service system 175. For example, service system 175 may (e.g., at the direction of a dealer or technician) send information (e.g., instructions, software, etc.) and/or configure (e.g., turn on) parameters/flags within an ECM in work machine 105, thereby activating the ECM to operate as a TPCM. In certain configurations, a TDS may be installed by a single ECM. For example, service system 175 may set parameters in one ECM, and that ECM may then set parameters in other ECMs. In certain embodiments, each ECM may default to a slave configuration upon initial installation in work machine 105.

Upon installing a TDS in work machine 105, the TDS may be configured (step 320). In one embodiment, an owner or operator of work machine 105 may configure the TDS by setting various parameters in one or more TPCMs. The operator may specify parameters through communications module 123 and/or service system 175. Configuring the TDS may include programming primary and secondary passwords, specifying reset questions and passwords, and specifying a particular master/slave configuration for the ECMs in work machine 105. In certain embodiments, an operator may set one or more TPCM configuration parameters/flags in each TPCM's memory to set the master/slave configuration. For example, setting the TPCM configuration flag to 1 may indicate that the TPCM is a master, and setting the TPCM configuration flag to 0 may indicate that the TPCM is a slave.

Once each TPCM in the TDS is configured, the TDS may be activated (step 330). When activated, the TDS may be operational. That is, an activated TDS may be operable to perform various TDS functions. Activating the TDS may include configuring one or more parameters in each TPCM's memory to reflect that the TDS is ready for operation. In one embodiment, activating the TDS may include setting an TDS activation parameter in one or more TPCMs. Slave TPCMs may verify the status of the TDS activation parameter with master TPCM 125. If the parameter is enabled in the master, the slave will enable its parameter.

Consistent with embodiments of the present invention, a factory password may be required to install/activate the TDS. For example, after service system 175 turns on installation and/or activation parameters in one or more ECMs, a valid factory password may be required to keep the system activated. If valid factory password is not entered, then the ECMs may deactivate.

Once the TDS is configured and activated, it may be enabled (i.e., engaged) (step 340). When enabled, the TDS may engage one or more security operations for work machine 105. That is, enabling the TDS may cause one or more TPCMs to limit access and/or control over one or more operational systems 121. Enabling the TDS may engage one or more functions, such as a fuel injection lock-out, a starter lock-out, a keyless ignition lock-out, and a engine speed limit. Master TPCM 125 may control certain operational systems 121 (e.g., transmission, throttle, etc.), and master TPCM 125 may instruct one or more secondary TPCMs 135 to control other operational systems 121 (starter, ignition, etc.).

In certain embodiments, master TPCM 125 may be configured to automatically enable the TDS upon work machine 105 (or an engine on work machine 105) powering down. In other embodiments, the TDS may engage in response to work machine 105 powering up. The TDS may be automatically enabled with all available TDS features, or a pre-configured (e.g., at step 320) combination of features. In other embodiments, a configured and activated TDS may initialize (i.e., power up) and then standby for an operator to enable the system. In such embodiments, master TPCM 125 may be configured to wait for an enable command to enable the TDS. Upon receiving such a command (e.g., via communications module 123), one or more TDS functions may engage. For example, master TPCM 125 may engage all available TDS features, or a pre-configured (e.g., at step 320) combination of features, upon receiving the enable command. Consistent with embodiments of the present invention, operators with primary or secondary access may enable the TDS. An operator may input a primary or secondary password to communications module 123 or 133 and then, upon gaining access to the TDS, may input a command to enable the TDS. Secondary access may only allow the operator to enable the TDS in its current configuration. Primary access may allow the operator to engage and disengage various TDS functions.

As explained above, enabling the TDS may engage one or more TDS features (e.g., fuel injection lock-out, starter lock-out, keyless ignition lock-out, and engine speed limit). Consistent with embodiments of the present invention, master TPCM 125 may, in conjunction with secondary TPCMs 135, limit access to and control over operational systems 121. Once the TDS is enabled, master TPCM 125 may display a message (via communications modules 123 or 133) indicting that the system is enabled and prompting an operator for a primary password (step 350). At this point, the operator may be allowed to either enter the primary password or switch to a secondary access screen. Passwords may be any combination of numbers, letters, symbols, etc. Further, passwords may include biometric prints, such as voice prints, retinal scans, fingerprints, breath samples, etc. If the operator enters a primary password (step 355—No; step 360), the password may be routed to master TPCM 125 (step 370) and validated (step 380). Routing the password may include sending the password from communications module 123 directly to master TPCM 125. In addition, routing may include sending the password from communications module 133 to secondary TPCM 135 and then forwarding the password to master TPCM 125 over data link 160. Assuming the primary password is valid, primary access may be granted (step 390). Primary access may enable the operator to completely disable the TDS, change TDS configuration, and engage/disengage TDS functions. Primary access may allow full operation of work machine 105. If the operator switches to secondary access (step 355—Yes), then the operator may enter a secondary access password (step 362), which may be routed to master TPCM 125 (step 372) and validated (step 382). Assuming the secondary access password is valid, secondary access may be granted (step 392). Secondary access may disable one or more of the TDS functions. For example, all TDS functions may disengage except for an RPM limit.

In certain embodiments, the TDS may be configured to "lock-out" in response to invalid passwords, and validating passwords (steps 380, 382) may include locking the TDS. In such embodiments, master TPCM 125 may be programmed with a threshold value representing a maximum number of password input attempts. For example, an operator may be given five attempts to enter a password before master TPCM locks out the TDS. When locked, the TDS may remain enabled and may require a password reset question to be answered. Consistent with embodiments of the present invention, master TPCM 125 may be configured to lock-out the TDS upon receiving incorrect passwords at that level of password entry. For example, if an incorrect secondary password is received six times, master TPCM 125 may only lock-out secondary access to the system and require the next higher password or reset question to unlock the TDS. Thus, primary access may remain available in the event secondary access locks. Additional details of invalid password processing will be discussed below in connection with FIG. 4.

Enabling, Disabling, and Resetting the TDS

Consistent with embodiments of the present invention, the TDS may operate in various states. For example, the TDS may operate in an enable state, a disable state, and a locked state. When enabled, the TDS may provide one or more security features to work machine 105 by limiting access and control to operational systems 121. For example, enabling the TDS may engage one or more functions, such as a fuel injection lock-out, a starter lock-out, a keyless ignition lock-out, and a engine speed limit. Consistent with embodiments of the present invention, the TDS may be configured to operate in one or more enable modes. For example, the TDS may operate in a primary enable and secondary enable mode. In primary mode, the TDS may, for example, perform a plurality of functions, such as fuel injection lock-out, starter lock-out, keyless ignition lock-out, and engine speed limit. In secondary mode, one or more of the security functions may be disabled. The secondary mode of operation may, for example, allow a dock master or mechanic to operate work machine 105 subject to an RPM limit.

Consistent with embodiments of the present invention, master TPCM 125 may allow a user to enable the TDS as long as engine speed is zero. In one embodiment, an operator may enable the TDS by actuating a button or selecting an item (e.g., a GUI element) via communications module 123 and/or 133. In other embodiments, master TPCM 125 may require a primary or secondary password before enabling the TDS. Further, master TPCM 125 may be configured to enable the TDS a certain amount of time after work machine 105 (or an engine in work machine 105) powers down. This may allow an operator a chance to restart the engine if the engine stalls or power is interrupted to the system.

When disabled, the TDS may provide a user with full access to operational systems 121 in work machine 105. That is, an operator may gain full control over work machine 105 when the TDS is disabled. In certain embodiments, a valid primary access password is required in order to disable the TDS. Once the TDS is disabled, an operator with primary access may specify and/or change functions of the TDS (e.g., specify specific locks for operational systems 121). A secondary access password may cause the TDS to partially disable (i.e., operate in secondary enable mode). When partially disabled (i.e., secondary enable mode), the operator may not be permitted to change or specify TDS functions.

In certain embodiments, the TDS may be placed in a lock state in response to certain events. When locked, the TDS may be inaccessible to operators. Further, the TDS may remain enabled when in a locked state. As explained above, receiving a certain number of incorrect passwords may trigger the TDS to lock at that level of password entry. Thus, if an invalid secondary password is received a certain number of times (e.g., 5), master TPCM 125 may keep the TDS enabled and lock the TDS. A valid primary password may then be required to unlock and disable the TDS. If an invalid primary password is received a certain number of times, then master TPCM 125 may keep the TDS enabled and lock the TDS. If primary access is locked, the TDS may require a reset.

As explained above, a secondary access lock be unlocked by a valid primary password. In one embodiment, a primary access lock may prevent both primary and secondary access. Thus, a password reset question may be required to unlock the system. However, in alternative embodiments, a primary lock may lock-out primary access but allow secondary access. Thus, if a user forgets his primary password and is locked out, a secondary password could be used to gain secondary access (e.g., to move the work machine).

Figure 4:
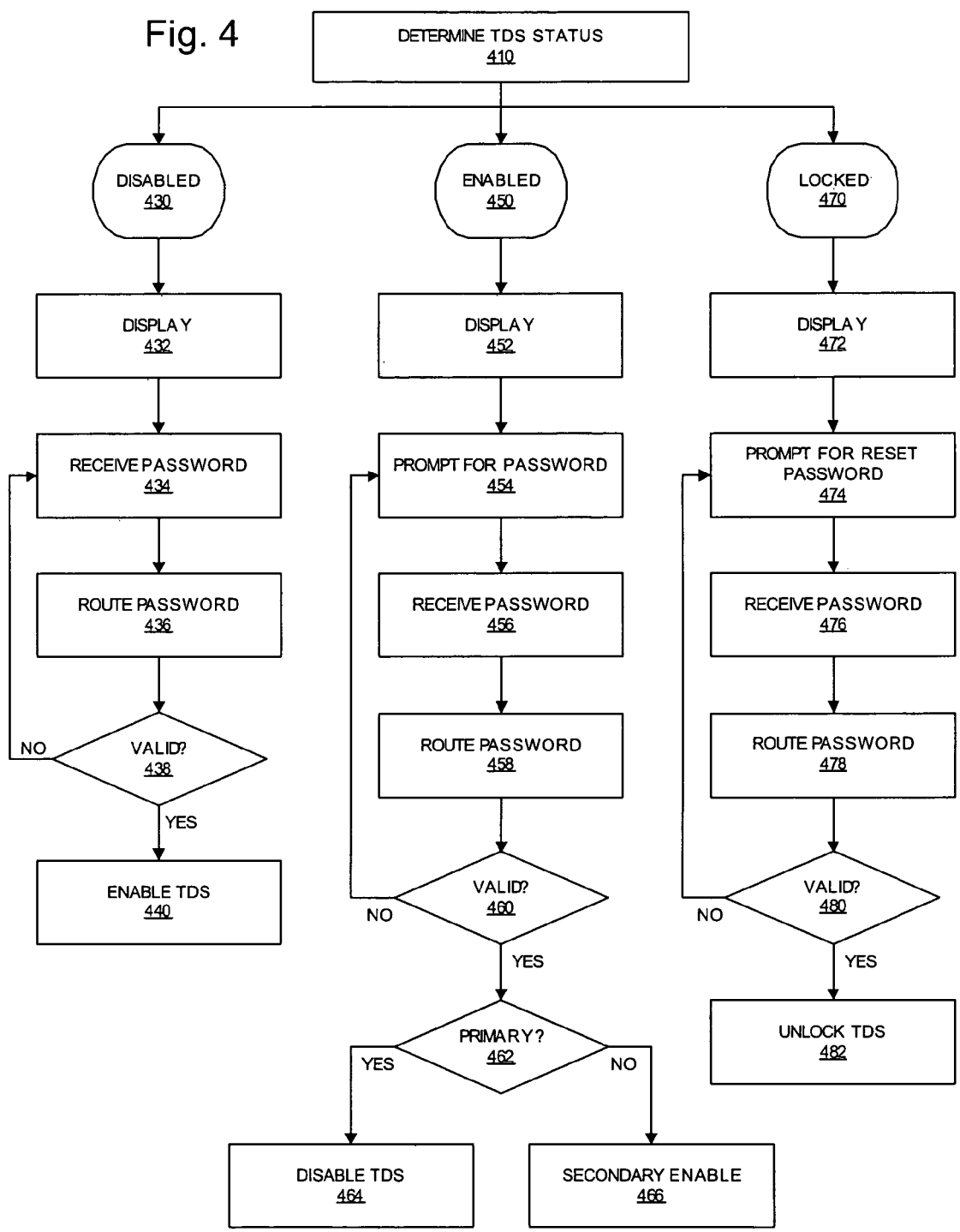
FIG. 4 is a flowchart of an exemplary TDS operating state process consistent with certain embodiments of the present invention.

FIG. 4 illustrates a flowchart of an exemplary TDS operating state process consistent with certain embodiments of the present invention. In operation, the TDS status may be determined (step 410). Determining the TDS status (i.e., state) may include broadcasting a status request from one or more of service system 175, computer system 185, or communications modules 123 and 133 may broadcast a message on data link 150. In one embodiment, a user may initiate the status request by generating a command to enable or disable the TDS. In certain embodiments, master TPCM 125 and/or secondary TPCMs 135 may automatically generate status requests to provide status updates to a user or other system components. Further, one or more of service system 175, computer system 185, or communications modules 123 and 133 may automatically broadcast status requests at predetermined time intervals. In response to a status request, one or more TPCMs may respond to respective requestors with the requested status information. For example, secondary TPCM 135 may respond to a status request from communications module 133, and primary TPCM 125 may respond to a status request from communications module 123. Consistent with embodiments of the present invention, a status response may reflect the TDS mode of operation (i.e., disabled, enabled, or locked).

In certain embodiments, determining TDS status (step 410) may include one or more TPCMs pushing TDS state information to service system 175, computer system 185, and/or communications modules 123 and 133, e.g., periodically or in response to state changes. For example, every time the TDS state changes, master TPCM 125 may push a status update to communication module 123 and secondary TPCM 135, which in turn may push the state information to communication module 133.

If the TDS is disabled (state 430), then work machine 105 may operate normally and the TDS may be transparent to operators. Further, communications modules 123 and 133 may operate normally without displaying any TDS information. If, however, an operator is attempting to enable the TDS from a particular communication module (e.g., 133), that communications module may display an "Enable System" screen and standby for a password (step 432). To enable the TDS, an operator may then input a password (primary or secondary) to the communications module (e.g., 133) (step 434). The password may then be routed (directly or indirectly) to master TPCM 125 (step 436). If the password is valid (step 438—Yes), master TPCM 125 may enable the TDS (step 440). Master TPCM 125 may then display (via communications modules 123 and/or 133) a corresponding message. As mentioned above, enabling the TDS may cause one or more TDS functions to engage. That is, enabling the TDS may limit access and/or control over one or more operational systems 121. Consistent with embodiments of the present invention, master TPCM 125 may control certain operational systems and secondary TPCM 135 may control others.

In the event master TPCM 125 receives an invalid password (step 438—No), then communications module 123 may prompt the operator to input the password again. In one embodiment, receiving a certain number of incorrect passwords may trigger the TDS to lock at that level of password entry.

If the TDS is enabled (state 450), communications module 123 and/or 133 may display a "System Enabled" screen (step 452) and prompt for a password to disable the TDS (step 454). In one embodiment, communications module 123 may prompt for a primary password and allow an operator to switch to a secondary password input screen. In other embodiments, communications module 123 may prompt the operator to specify an access level and then provide a corresponding password prompt. In alternative embodiments, communications module 123 may prompt for a password and master TPCM 125 may dynamically determine whether the received password is a primary or secondary password.

Once a password (primary or secondary) is received (step 456), it may be routed to master TPCM 125 (step 458). Master TPCM 125 may then determine whether the password is valid (step 460). If the received password is valid (step 460—Yes) and the password is a primary password (step 462—Yes), then master TPCM 125 may disable the TDS system (step 464). At this point, the operator may gain full control over operational systems 121 in work machine 105, change TDS settings, and configure the TDS. If the received password is not valid (step 460—No), then communications module 123 may prompt the operator for the password again (step 454).

If the received password is valid (step 460—Yes) and the password is a secondary password (step 462—No), then master TPCM 125 may cause the TDS to operate in secondary enable mode (step 466). In this state, master TPCM 125 may disable one or more TDS features. Secondary enable mode may allow limited control over one or more operational systems 121 in work machine 105. For example, master TPCM 125 may provide full access to operational systems 121 expect for an RPM limit. As explained above, receiving a certain number of incorrect passwords (either primary or secondary) may trigger the TDS to lock at that level of password entry.

If the TDS is locked (state 470), communications module 123 and/or 133 may display an "System Locked" screen and indicate that a reset is required (step 472). In order to reset the TDS, service system 175 may interface with master TPCM 125 and prompt an operator for a reset password (step 474). In certain embodiments, service system 175 may require that a password reset question be successfully answered before accepting the password reset. A user may provide a reset password via service system 175 (step 476), which may be routed to master TPCM 125 (478). If the reset password is valid (step 480—Yes), then master TPCM 125 may unlock the TDS (step 482). Unlocking may include (or trigger) clearing all passwords and/or disabling the TDS. If the reset password is invalid (step 480—No), then the TDS may remain locked, and service system 175 may prompt for the reset password again (step 474). If the operator is unable to enter a valid reset password, the TDS may require re-activation. In one example, the TDS may be deactivated and then re-activated by a dealer or technician via service system 175.

Exemplary Operation

Figure 5:
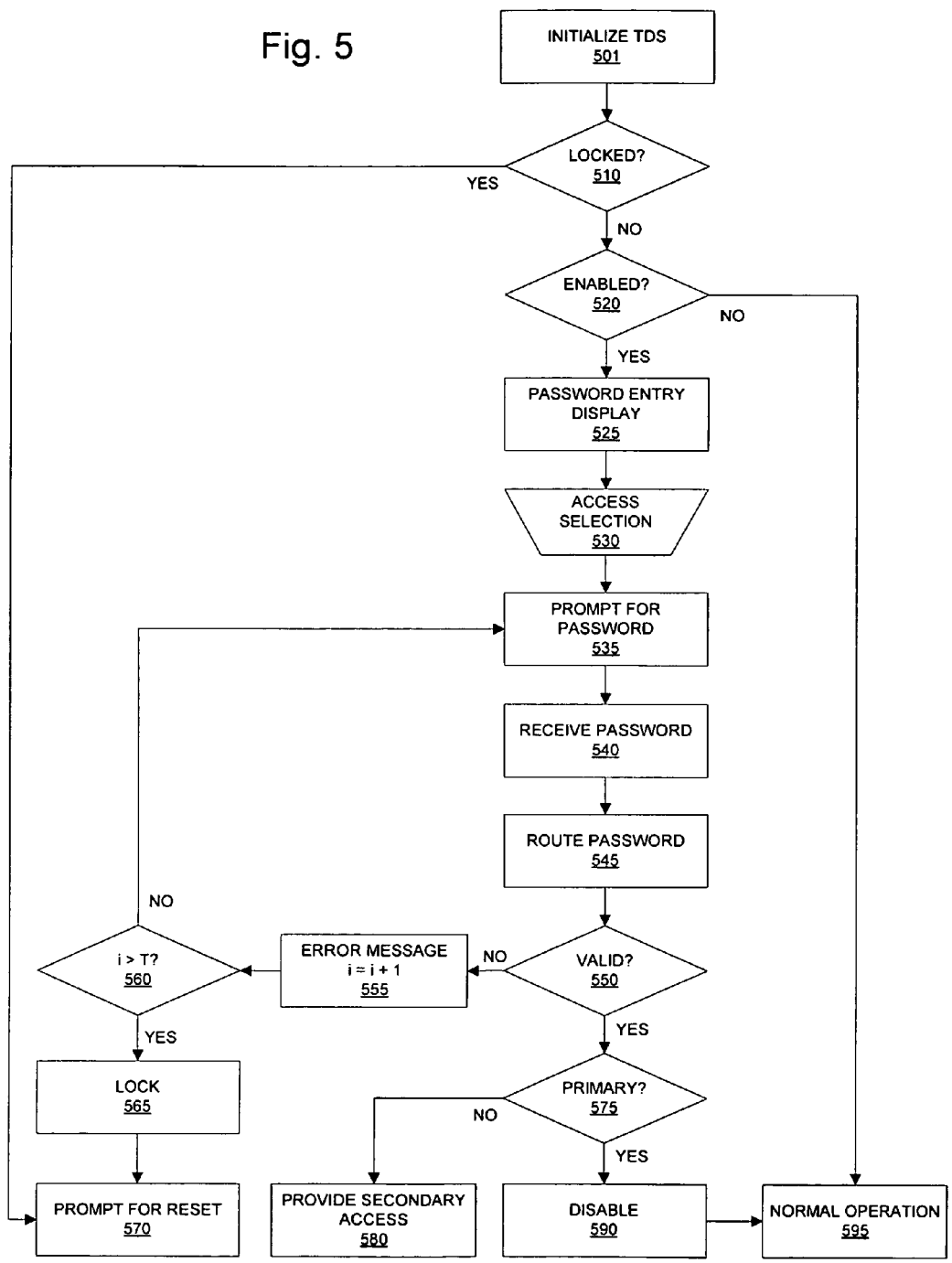
FIG. 5 is a flowchart of an exemplary TDS process consistent with certain embodiments of the present invention.

To better illustrate aspects of the present invention, FIG. 5 illustrates a flowchart of a first exemplary operation process of a TDS in work machine 105. The exemplary operation may begin when an installed and activated TDS is initialized (step 501). Initializing the TDS may include providing power to master TPCM 125 and secondary TPCM 135. In one embodiment, the TDS may be initialized when work machine 105 powers up.

Upon initialization, master TPCM 125 may determine if the activated TDS is locked (step 510). Master TPCM 125 may, for example, examine one or more PIDs in memory 220 to determine whether the TDS is locked. If the TDS is locked (step 510—Yes), then master TPCM 125 may execute a reset function, in which master TPCM 125 prompts (e.g., via communications module 123) the operator to reset the system (step 570). If, however, master TPCM 125 determines that the TDS is unlocked (step 510—No), then master TPCM 125 may determine whether the TDS is enabled (step 520). That is, master TPCM 125 may examine one or more parameters in memory 220 to determine if one or more TDS functions are engaged (e.g., transmission lock, RPM limit, fuel injection lock, etc.). If master TPCM determines that the TDS is not enabled (step 520—No), then work machine 105 may operate normally (step 595).

Figure 6A:
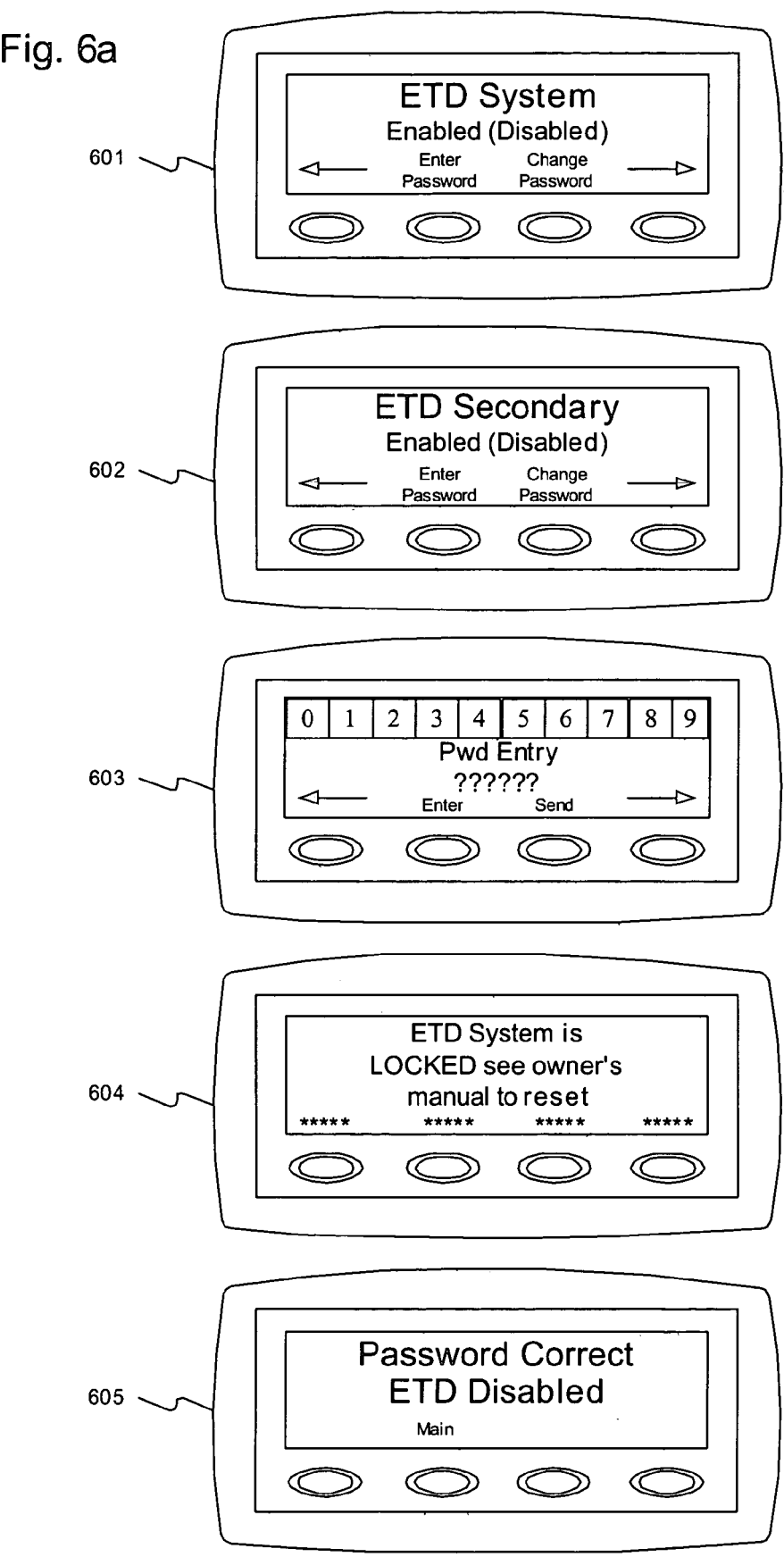
FIG. 6a shows exemplary TDS displays consistent with embodiments of the present invention.

If the TDS is unlocked and enabled (step 520—Yes), then master TPCM may send a message to communications module 123 and/or 133 instructing the module to display a password entry or main menu screen (step 525). In certain embodiments, a primary password entry display may be presented, such as exemplary display 601 shown in FIG. 6a. An operator may also change to a secondary password entry screen in order to gain secondary access (selection 530). FIG. 6a illustrates an exemplary secondary access display 602 consistent with this embodiment of the present invention. Primary access may enable the operator to completely disable the TDS and change system settings. Secondary access will only partially disable the TDS. For example, secondary access may enable a dock master or mechanic to operate work machine 105 with an RPM limit. After the operator selects a password entry screen, master TPCM 125 may then prompt the operator (e.g., using communications module 123 and/or 133) to enter a password (step 535). FIG. 6a illustrates an exemplary password prompt display 603 consistent with embodiments of the present invention.

At this point, the operator may input a password to communications module 123 or 133 (step 540). Communications module 123 and/or 133 may then transmit the password over data link 150 to master TPCM 125 (step 545). If the operator enters the password in communications module 133, the password may be routed to secondary TPCM 135 and then forwarded over data link 160 to master TPCM 125. Upon receiving the password, master TPCM 125 may determine if the password is valid (step 550). If the password is not valid (step 550—No), then master TPCM 125 may display an error message via communications module 123 or 133 and increment an attempt counter (i) (step 555). Master TPCM 125 may then determine whether the attempt counter exceeds a predetermined threshold (T), e.g., 5 attempts, (step 560; i>T). If the attempt counter exceeds the threshold (step 560—Yes), then master TPCM 125 may lock the TDS (step 565), and prompt/wait for a reset (step 570). FIG. 6a depicts an exemplary reset prompt display 604 that may be presented to the user when the TDS is in the reset wait state.

Locking the system may include keeping the TDS enabled and preventing access to the system (i.e., preventing operators from disabling the TDS). In certain embodiment, master TPCM 125 may lock the TDS only at the level of password entry. For example, if an invalid secondary password is entered more than five times, secondary access may be locked, and the next higher password (i.e., a primary password) or reset question may be required to unlock the system. If the threshold is not exceeded (step 560—No), then the operator may be promoted for a password again (step 535).

Figure 6B:
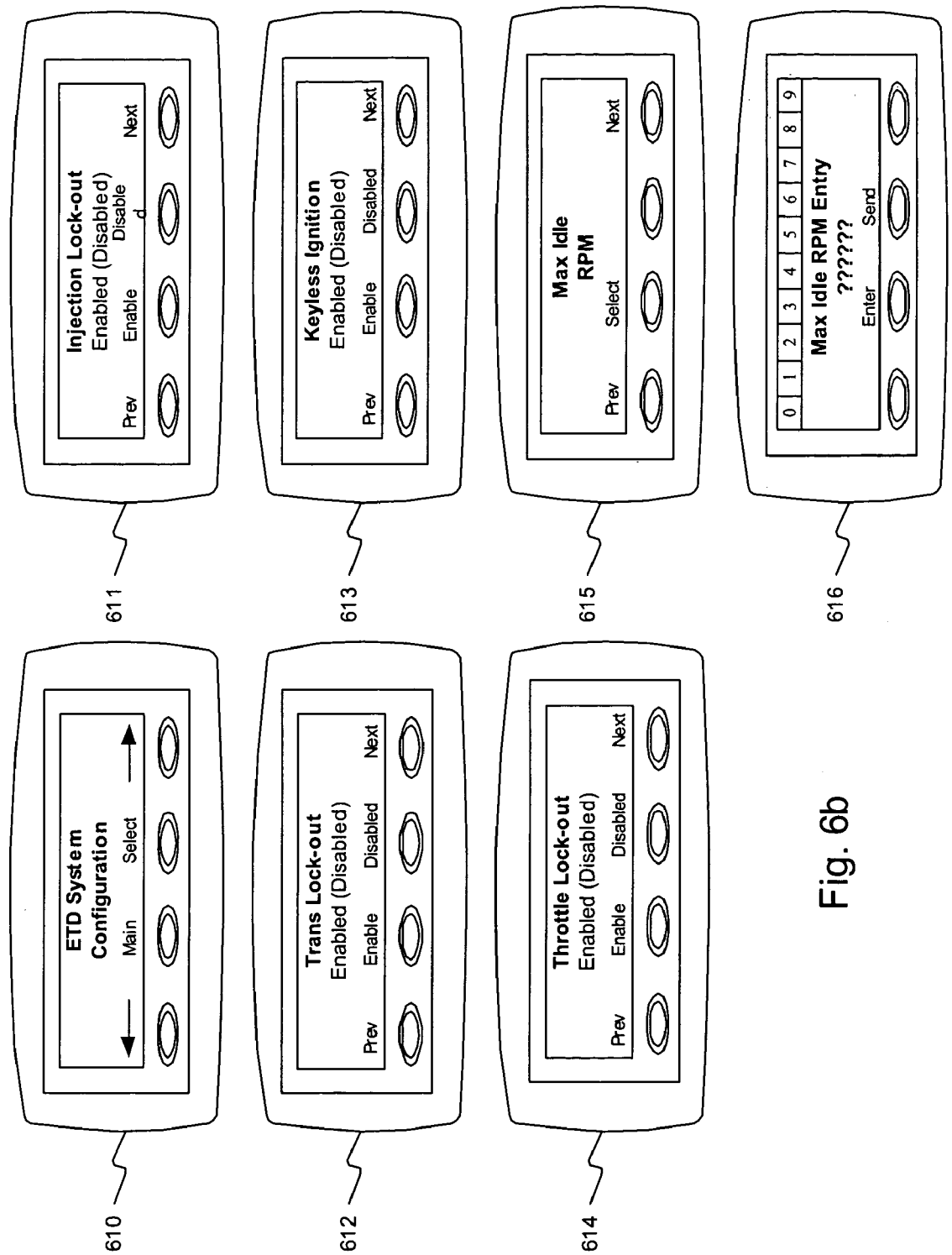
FIG. 6b shows exemplary TDS displays consistent with embodiments of the present invention.

If the received password is valid (step 550—Yes) and it is a primary password (step 575—Yes), then master TPCM 125 may disable the TDS (step 590) and present a corresponding message, such as exemplary disable display 605 shown in FIG. 6a. Master TPCM 125 may then allow normal operation of work machine 105 (step 595). In one embodiment, a primary operator (i.e., a user with an associated primary password) may configure the TDS, when it is disabled, through various configuration screens displayed by master TPCM 125 (e.g., via communication module 123 and/or 133). For example, the primary operator may enable, disable, and restrict certain operational systems 121. FIG. 6b depicts a few exemplary displays 610-616 that may be presented by master TPCM 125 consistent with these embodiments. If the password is a valid secondary password (step 550—Yes; step 575—No), then master TPCM 125 may provide secondary access to work machine 105 (step 580). For example, master TPCM 125 may disable all enabled lock-out features except an RPM limit. At this point, master TPCM 125 may present a message indicating a secondary disable and provide limited operation to work machine 105.

Reacting to a TDS Override Attempt

Consistent with embodiments of the present invention, methods and systems may prevent a TDS override by automatically activating new ECMs to operate as TPCMs. In certain embodiments, all of the TPCMs and associated devices (e.g., communications modules 123 and 133) in a given TDS may be aware of the TDS status. For example, each TPCM in work machine 105 may transmit and receive status requests on data link 160. Also, each TPCM may expect certain messages at certain times from each other TPCM in work machine 105. In addition, certain parameters in an ECM memory may indicate whether that ECM is configured/operable as a TPCM. A replacement non-TDS ECM may be detected when one or more TDS ECMs detect that a specific parameter is not set in a particular ECM. Accordingly, removal and/or replacement of a TPCM may be detected by other TPCMs in a given TDS. In certain embodiments, each TPCM may be able to configure or activate a new ECM to operate as a TDS ECM (i.e., a TPCM). Further, the TDS may be configured to lock in the event of a TPCM removal. In this fashion, robust theft protection is provided. The TDS may prevent a thief from replacing an installed TPCM with a new ECM (that does not have the TDS installed or activated) in order to bypass the system.

Figure 7:
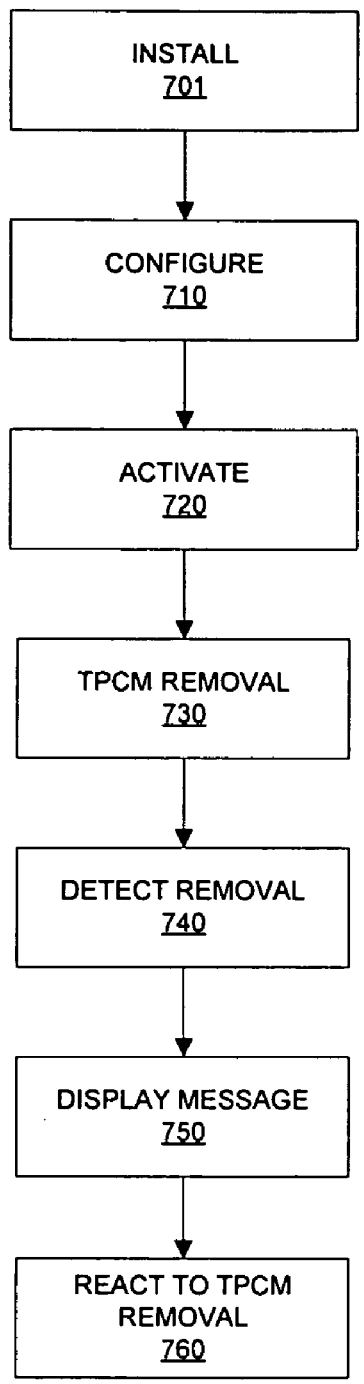
FIG. 7 is a flowchart of an exemplary process for reacting to TDS override attempts, consistent with certain embodiments of the present invention.

FIG. 7 is a flowchart of an exemplary process for reacting to a TPCM removal consistent with embodiments of the present invention. Initially, during this process, a TDS may be installed (step 701), configured (step 710), and activated (720). Steps 701, 710, and 720 may represent methods consistent with those described above in connection with steps 310, 320, and 330 of FIG. 3, respectively. After the TDS is installed and configured, one or more TPCMs (e.g., secondary TPCM 135) may be removed (step 730). For example, a thief may remove secondary TPCM 135 and replace it with a new non-TPCM ECM in an attempt to override the TDS.

Consistent with embodiments of the present invention, the TDS may detect the removal (step 740) of secondary TPCM 135. For example, master TPCM 125 (or another secondary TPCM 135) could detect the removal. In one embodiment, a TPCM removal may be detected when one or more other TPCMs fail to receive an expected message or response from the removed TPCM. In addition, or as an alternative, master TPCM 125 and/or secondary TPCMs 135 may detect a TPCM replacement by examining one or more parameters. For example, each TPCM may be configured to examine certain parameters in other TPCMs when work machine 105 powers up. In this fashion, a non-TDS ECM may be detected when one or more TDS ECMs detect that a specific parameter is not set in a particular ECM. In certain configurations, communications modules 123 and/or 133 may display a message indicating the removal of a TPCM (step 750).

Upon detecting a new non-TPCM ECM, one or more remaining TPCMs in work machine 105 may react to the removal (step 760). Reacting to a TPCM removal may include activating a new ECM to operate as a TPCM. For example, master TPCM 125 may detect that secondary TPCM 135 has been replaced with a new non-TPCM ECM. In response, master TPCM 125 may activate the new ECM to operate as a TPCM by, for example, sending one or more messages, instructions, and/or software modules to the new ECM. Activating a new ECM may also include manipulating one or more parameters within a memory of the new ECM. Activating the TDS on new ECMs may prevent an unauthorized user from overriding the TDS. In certain embodiments, reacting to the removal (step 760) may include engaging one or more TDS functions (e.g., transmission lock, RPM limit, etc.) and/or locking the TDS at the primary and/or secondary access levels. In this fashion, the TDS may provide theft protection to work machine 105 in the event of an TDS override attempt.

Reacting to Master TPCM Failure

In certain situations, lack of a master TPCM on the work machine data link (e.g., 160) or a master TPCM failure may be problematic for TDS system operation. For example, master TPCM 125 may be configured to verify passwords received from users. If such a master TPCM is not present to verify primary passwords, various operational systems 121 may remain restricted.

Consistent with embodiments of the present invention, methods and systems may be provided for reacting to a master TPCM failure. In one example, methods and systems of the present invention may provide secondary password verification functionality for the ETD system. In certain embodiments, one or more secondary TPCMs 135 may be configured to take over in a limited fashion in the event of a master TPCM failure or removal. For example, secondary TPCM 135 may be configured to accept and verify passwords received from users in the event of a master TPCM failure or removal. Consistent with principles of the present invention, secondary TPCM 135 may be configured to detect a failure of removal of the master TPCM, e.g., by examining parameters in memory and/or examining information from the work machine data link. Detecting a master TPCM failure of removal may, in one example, include steps and events similar to those described in connection with step 740 explained above. Secondary password verification functionality may provide users with unrestricted access to a particular work machine.

Password Changes

Figure 8:
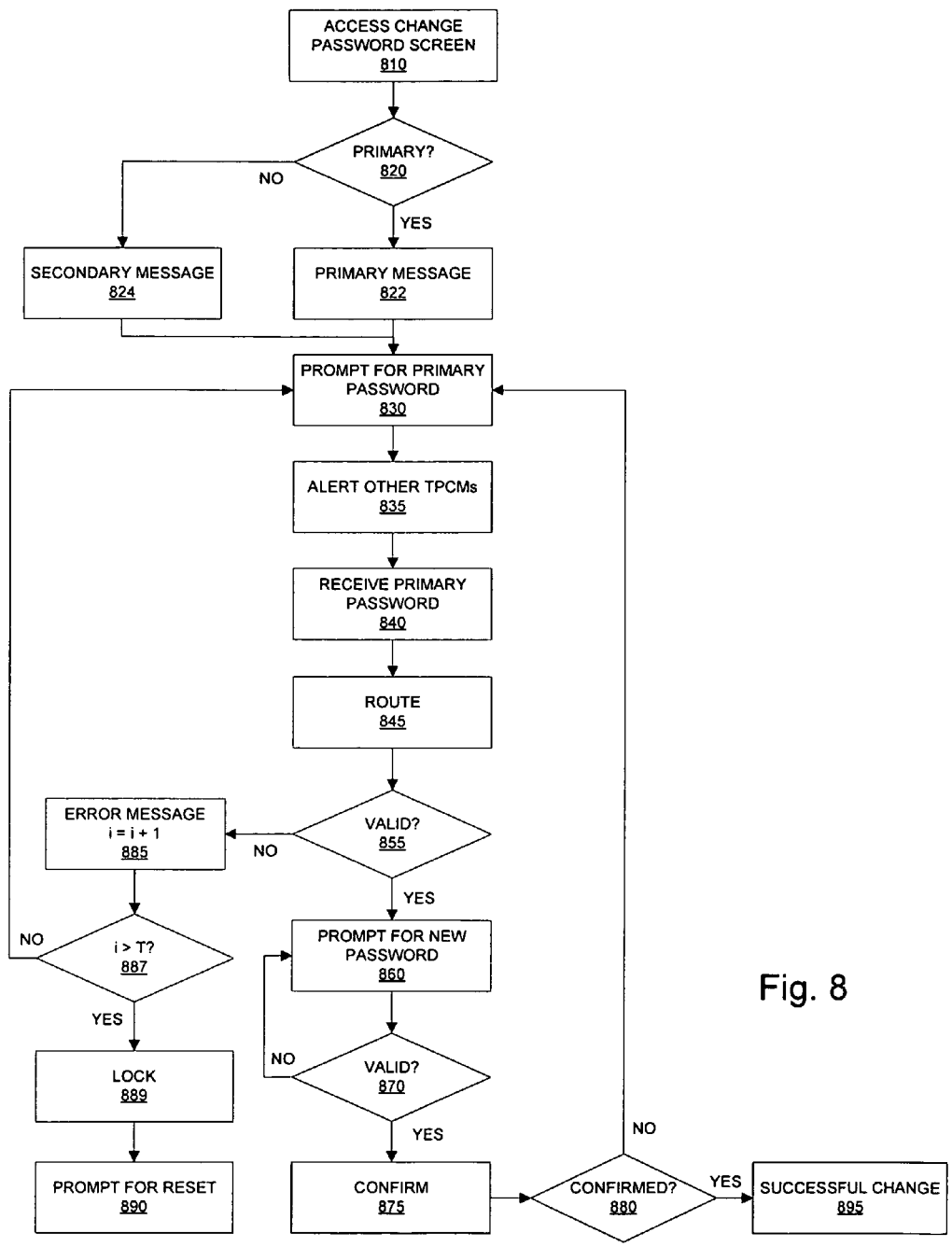
FIG. 8 is a flowchart depicting exemplary processes for changing passwords, consistent with embodiments of the present invention.

Consistent with embodiments of the present invention, an operator may be allowed to change passwords for both primary and secondary access. In certain embodiments, passwords may be changed when the TDS is disabled. That is, an operator may be unable to change any passwords if the TDS is operating in secondary enable mode. Thus, a valid primary password may be required to change a primary or secondary password. Moreover, passwords may not be changed if the TDS is locked. FIG. 8 is a flowchart of an exemplary password change process consistent with embodiments of the present invention.

Figure 9:
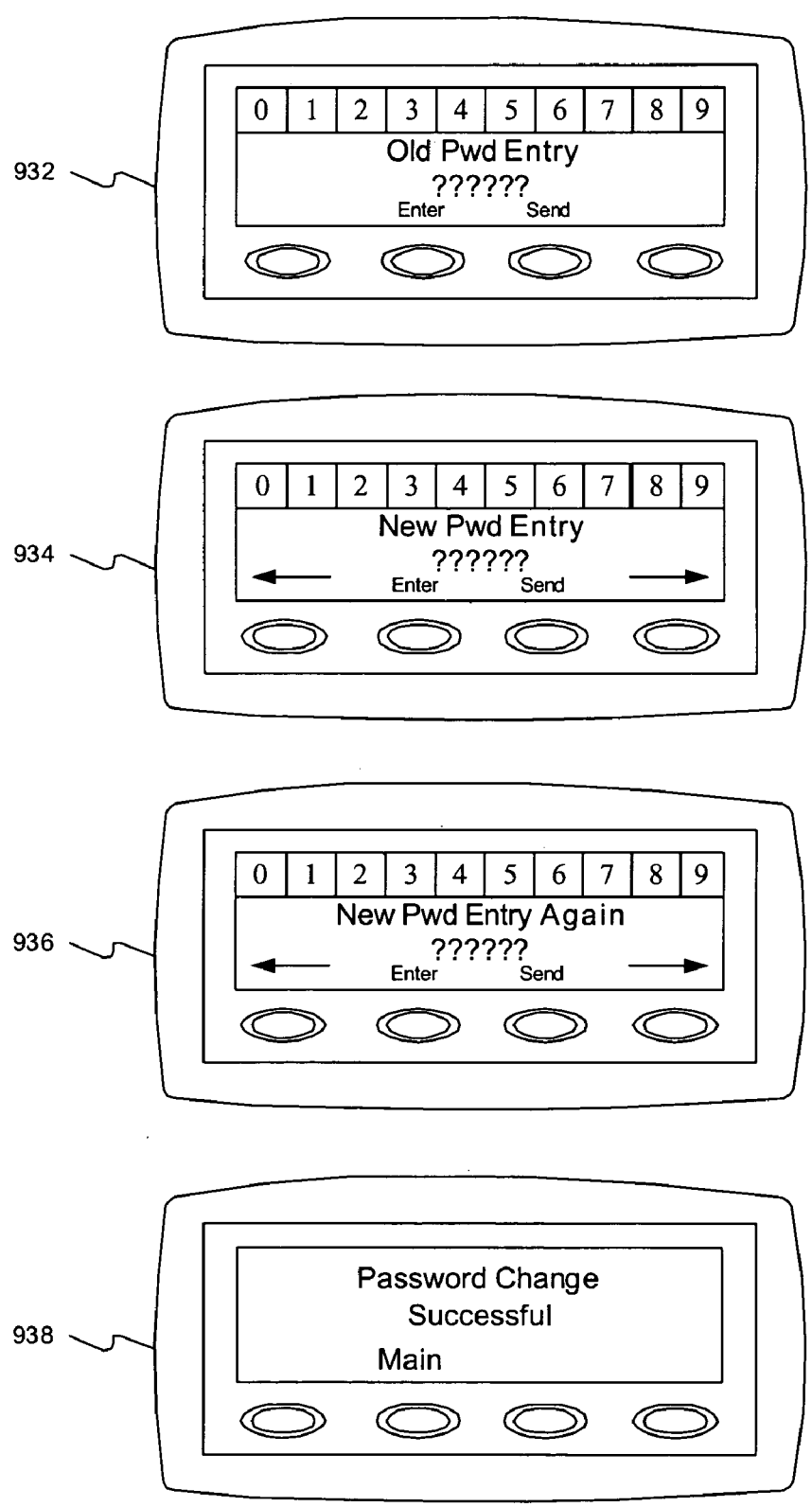
FIG. 9 shows exemplary TDS displays consistent with embodiments of the present invention.

The exemplary process of FIG. 8 may begin when an operator accesses a change password screen (step 810), through, for example, communication module 123 and/or 133. The operator may choose to change the primary or the secondary password. If the operator chooses to change the primary password (step 820—Yes), then the communication module will send a change primary password message to master TPCM 125 (step 822). If the operator chooses to change the secondary password (step 820—No), then the communication module will send a secondary change password message master TPCM 125 (step 824). Upon receiving a change password message (either primary or secondary), master TPCM 125 may prompt the operator (e.g., via communications module 123 or 133) to enter the current primary password (step 830). FIG. 9 depicts an exemplary password entry display 932 consistent with this embodiment of the present invention. At this point, master TPCM 125 may also alert the other TPCMs in work machine 105 (e.g., secondary TPCM 135) that a password change is occurring (step 835).

Upon viewing the primary password prompt, the operator may enter (e.g., via communications module 133) the current primary access password (step 840). Once the primary password is entered, it may be routed to master TPCM 125 (step 845) and validated (step 855).

If master TPCM 125 determines that the received primary password is valid (step 855—Yes), then master TPCM 125 may prompt (e.g., via communications module 123 or 133) for a new primary or secondary password (step 860). FIG. 9 shows an exemplary new password entry display 934 consistent with embodiments of the present invention. If the new password is not valid (step 870—No), master TPCM 125 may prompt the operator for a new password again (step 860). If, however, the password is valid (step 870—Yes), e.g., is in an acceptable format, then master TPCM 125 may prompt the operator to confirm the new password (step 875). FIG. 9 shows an exemplary password confirmation display 936 consistent with embodiments of the present invention. If the password is valid and the operator correctly confirms the new password (step 880—Yes), then master TPCM 125 may display a message (via communications module 123 and/or 133) indicating a successful password change (step 895). FIG. 9 shows an exemplary password change success display 938 consistent with embodiments of the present invention. If, however, the operator does not correctly confirm the new password (step 880—No), master TPCM 125 may prompt the operator to enter the current primary password again (step 830).

If the received primary password is not valid (step 855—No), then master TPCM 125 may display an error message and increment an attempt counter (e.g., i) (step 885). If the attempt counter is below a threshold number of attempts (e.g., T) (step 887—No), then master TPCM 125 may prompt the operator to enter the current primary password again (step 830). If the attempt counter exceeds the threshold (step 887—Yes), master TPCM 125 may lock the TDS (step 889) and prompt for a TDS reset (step 890).

Remote TDS Operation and Controlling Multiple Work Machines

Consistent with certain embodiments of the present invention, methods and systems may facilitate remote operation and control over a TDS in work machine 105. In certain embodiments, one or more computer systems 175 may be leveraged to provide such remote control. In such embodiments, computer system 185 may include or leverage one or more functions associated with service system 175. An operator and/or dealer may be able to configure, enable, disable, and reset the TDS, from a remote location, using computer system 185. The operator may also remotely specify/control various TDS functions (e.g., transmission lock, ignition lock, RPM limit, etc.) An operator and/or dealer may be allowed to input a password to computer system 185, which in turn may route the password to master TPCM 125 in work machine 105 (e.g., via the Internet). In certain embodiments, an operator and/or dealer may be able to monitor work machine 105 from a remote location. For example, master TPCM 125 may transmit information from one or more sensors and/or from monitoring system 140 to computer system 185, e.g., via the Internet.

In one embodiment, computer system 185 may be programmed with software that automatically controls a TDS in work machine 105, without operator intervention. For example, computer system 185 may automatically enable and disable the TDS at predetermined times. Computer system 185 could also automatically engage and disengage one or more TDS functions (e.g., transmission lock, ignition lock, RPM limit, etc.). Further, computer system 185 may be configured to monitor work machine 105 (e.g., by interacting with master TPCM 125 and/or monitoring system 140) and react to certain events. For example, computer system 185 may be configured to send notifications (e.g., via cell phones, e-mails, voice mails, facsimiles, instant messages, etc.) to an operator in response to various events, e.g., a TPCM removal, activity in a specific location of work machine 105, etc.

Consistent with certain embodiments of the present invention, methods and systems may facilitate control (e.g., remote) over multiple work machines (e.g., a fleet). In certain embodiments, each work machine in a fleet of work machines may include a master control module 125 and one or more secondary control modules 135. Accordingly, each work machine may include one or more TDSs. Consistent with embodiments of the present invention, an operator may be allowed to monitor, and control (i.e., enable, disable, configure, unlock, etc.) each TDS in each work machine from a central location using computer system 185.

INDUSTRIAL APPLICABILITY

Consistent with embodiments of the present invention, methods and systems may provide theft protection services to one or more work machines. Such methods and systems may leverage one or more ECMs embedded in a work machine to provide a TDS. The ECMs may be configured in a master/slave arrangement and may interact with one or more work machine operational systems, e.g., ignition, transmission, fuel injection, throttle, etc. The ECMs may control access to the operational systems, thereby restricting and/or preventing access to the work machine.

In one embodiment, the TDS may provide various levels of access to the work machine. For example, the TDS may provide a user with primary and/or secondary access to a work machine. Primary access may allow full control over operational systems and theft protection functions. Secondary access may provide limited access to work machine by, for example, providing access to a certain number of operational systems. Providing secondary access may, for example, enable maintenance personnel to access the work machine subject to certain restrictions (e.g., engine speed limit).

In certain embodiments, the TDS may be configured to react to TDS override attempts. Consistent with principles of the present invention, one or more TDS ECMs in a work machine may be aware of the TDS status. For example, each TDS ECM may expect certain information from other TDS ECMs. In addition, each TDS ECM may include specific parameters in memory which indicate its status. If a TDS ECM is removed and replaced (in an attempt to override the system), one or more other TDS ECMs may detect the replacement. In one embodiment, a TPCM removal may be detected when one or more other TPCMs fail to receive an expected message or response from the removed TPCM. In addition, or as an alternative, each TPCM may be configured to examine certain parameters in other TPCMs when a work machine powers up. A replacement non-TDS ECM may be detected when one or more TDS ECMs detect that a specific parameter is not set in a particular ECM. Consistent with embodiments of the present invention, one or more TDS ECMs may configure a new ECM to operate as a TDS ECM, e.g., by setting certain parameters, uploading software, sending instructions, etc. In this fashion, robust theft protection is provided. The TDS may prevent a thief from replacing an installed TPCM with a new ECM (that does not have the TDS installed or activated) in order to bypass the system.

In certain embodiments, methods and systems consistent with the present invention may be provided for reacting to a master TPCM failure and/or removal. Methods and systems of the present invention may, for example, provide secondary password verification functionality for the ETD system. In certain embodiments, secondary TPCM 135 may be configured to accept and verify passwords received from users in the event of a master TPCM failure or removal. This functionality may be particularly useful in marine applications. For example, if a master TPCM failure occurred on a vessel several miles from land, the ETD system could potentially default to enable mode, which may engage one or more restrictions (e.g., locks) on one or more operational systems in the vessel. In such a case, the user might be forced to travel with a restricted RPM. However, providing secondary password verification (e.g., by one or more secondary TPCMs) may enable the user to gain access to the ETD system and restore vessel operation.

In certain embodiments, methods and systems consistent with the present invention may provide theft protection for a plurality of work machines. For example, a fleet of geographically-dispersed vessels may be protected. Further, an operator may control one or more TDSs from a remote location (e.g., using the Internet). An operator may also monitor one or more work machines from a remote location. For example, a work machine owner could monitor work machine systems and or activity in the work machine.

In one embodiment, a computer system associated with a work machine may automatically monitor one or more work machines and notify a user in response to certain events. For example, an owner could receive e-mail, telephone messages, instant messages, etc. that indicate an occurrence of one or more events associated with the work machine (e.g., TDS ECM removal, TDS lock, activity in the work machine, etc.).

For clarity of explanation, environment 100 is described herein with reference to the discrete functional elements illustrated in FIGS. 1 and 2. However, it should be understood that the functionality of the illustrated elements and modules may overlap and/or may exist in a fewer or greater number of elements and modules. Elements of each system may, depending on the implementation, lack certain illustrated components and/or contain, or be coupled to, additional or varying components not shown. Moreover, all or part of the functionality of the illustrated elements may co-exist or be distributed among several geographically dispersed locations.

In addition, FIGS. 3-9 are consistent with exemplary implementations of the present invention. Further, it should be understood that the sequence of events described in FIGS. 3-5, 7, and 8 are exemplary and not intended to be limiting. Thus, other method steps may be used, and even with the methods depicted in FIGS. 3-5, 7, and 8, the particular order of events may vary without departing from the scope of the present invention. Moreover, certain steps may not be present and additional steps may be implemented in FIGS. 3-5, 7, and 8.

Embodiments, features, aspects and principles of the present invention may be implemented in various environments and are not limited to the illustrated environments. Further, the processes disclosed herein are not inherently related to any particular apparatus or system and may be implemented by a suitable combination of components. In addition, various types of general purpose devices may be used in accordance with the teachings described herein.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed embodiment, implementation, or configuration, with a true scope of the invention being indicated by the following claims.

What is claimed is:

1. A method for providing theft protection in a machine, comprising:

activating a first control module to restrict access to a first operational system in the machine;

activating a second control module to restrict access to a second operational system in the machine;

detecting, by the first control module, a substitution of a new control module for the second control module; and automatically configuring the new control module to restrict access to the second operational system in the machine.

2. The method of claim 1, wherein activating the first control module includes activating the first control module to engage one of a transmission lock, a throttle lock, an ignition lock, a fuel injection lock, and an RPM limit of the machine.

3. The method of claim 1, wherein activating the second control module includes activating the second control module to engage one of a transmission lock, a throttle lock, an ignition lock, a fuel injection lock, and an RPM limit of the machine.

4. The method of claim 1, wherein detecting includes examining, by the first control module, a parameter in a memory of the new control module.

5. The method of claim 1, wherein detecting includes receiving a message, from a third control module, indicating the substitution.

6. The method of claim 1, wherein the second control module is configured to send a signal to the first control module within a predetermined period of time, and wherein detecting includes determining when the first control module fails to receive the signal within the predetermined period of time.

7. The method of claim 1, wherein automatically configuring the new control module includes configuring at least one parameter in a memory of the new control module.

8. The method of claim 1, wherein automatically configuring the new control module includes transmitting executable instructions to the new control module.

9. A control apparatus for providing theft protection in a machine, comprising:

a first port that interfaces a first control module;

a second port that interfaces a communication device;

a third port coupled to a first operational system in the machine;

a memory including executable instructions for:
  restricting access to the first operational system in response to a command received from the communication device;
  detecting a substitution of a second control module for the first control module; and
  automatically configuring the second control module to restrict access to a second operational system in the machine; and a processor for executing the instructions included in the memory.

10. The apparatus of claim 9, wherein the first control module is an engine control module.

11. The apparatus of claim 9, wherein the communication device is a display device.

12. The apparatus of claim 9, wherein the first port interfaces the first control module via a proprietary data link.

13. The apparatus of claim 9, wherein the second port interfaces the communication device via a first non-proprietary data link, and the third port is coupled to the first operational system via a second non-proprietary data link.

14. The apparatus of claim 13, wherein at least one of the first and second non-proprietary data links is a J1939 data link.

15. The apparatus of claim 9, wherein the first operational system includes at least one of a transmission system, a fuel injection system, an ignition system, and a throttle system.

16. The apparatus of claim 9, wherein the memory includes executable instructions for examining a parameter in a memory of the second control module to detect the substitution of the second control module for the first control module.

17. The apparatus of claim 9, wherein the memory includes executable instructions for receiving a message, from a third control module, indicating a substitution of the second control module for the first control module.

18. The apparatus of claim 9, wherein the memory includes executable instructions for configuring at least one parameter in a memory of the second control module to automatically configure the second control module.

19. The apparatus of claim 9, wherein the memory includes executable instructions for transmitting executable instructions to the second control module to automatically configure the second control module.

20. A theft protection system, comprising:
means for activating a first control module to restrict access to a first operational system in a machine;
means for activating a second control module to restrict access to a second operational system in the machine;
means for detecting, by the first control module, a substitution of a new control module for the second control module; and
means for automatically configuring the new control module to restrict access to the second operational system in the machine.

21. A theft protection system in a machine, comprising:
a first control module coupled to a first data link and coupled to a first operational system in the machine;
a second control module coupled to the first data link and coupled to a second operational system in the machine; and
a communication module coupled to the first control module by a second data link and configured to receive commands from a user of the machine;
wherein the first control module is configured to:
restrict access to the first operational system in response to a first command received by the communication device;
activate the second control module to restrict access to the second operational system in response to a second command received by the communication device;
detect a substitution of a new control module for the second control module; and
automatically activate the new control module to restrict access to the second operational system.

22. The system of claim 21, wherein each of the first and second control modules is an engine control module.

23. The system of claim 21, wherein the first data link is a proprietary data link.

24. The system of claim 21, wherein the second data link is a non-proprietary data link.

25. The system of claim 24, wherein the second data link is a J1939 data link.

26. The system of claim 21, wherein the first control module is coupled to the first operational system via a J1939 data link.

27. The system of claim 21, wherein the second control module is coupled to the second operational system via a J1939 data link.

28. The system of claim 21, wherein the first operational system includes one of a transmission system, a fuel injection system, an ignition system, and a throttle system.

29. The system of claim 21, wherein the second operational system includes one of a transmission system, a fuel injection system, an ignition system, and a throttle system.

30. The system of claim 21, wherein the first control module detects the substitution of a new control module for the second control module by examining a parameter in a memory of the new control module.

31. The system of claim 21, wherein the first control module detects the substitution of a new control module for the second control module by receiving a message, from a third control module, indicating the substitution.

32. The system of claim 21, wherein the first control module automatically activates the new control module to restrict access to the second operational system by configuring at least one parameter in a memory of the new control module.

33. The system of claim 21, wherein the first control module automatically activates the new control module to restrict access to the second operational system by transmitting executable instructions to the new control module.

34. A theft protection system in a machine, comprising:
a first control module coupled to a first data link and coupled to a first operational system in the machine;
a second control module coupled to the first data link and coupled to a second operational system in the machine; and
a computer system remotely located with respect to the machine and coupled to the first control module by a network;
wherein the first control module is configured to:
restrict access to the first operational system in response to a first command received from the computer system;
activate the second control module to restrict access to the second operational system in response to a second command received from the computer system;
detect a substitution of a new control module for the second control module; and
automatically activate the new control module to restrict access to the second operational system.

35. A computer-readable medium including instructions for performing a method in a machine, the method comprising:
activating a first control module to restrict access to a first operational system in the machine;
activating a second control module to restrict access to a second operational system in the machine;
detecting, by the first control module, a substitution of a new control module for the second control module; and
automatically configuring the new control module to restrict access to the second operational system in the machine.

* * * * *